United States Patent [19]
Yeomans

[11] Patent Number: 5,309,893
[45] Date of Patent: May 10, 1994

[54] SOLAR ENERGY COLLECTING APPARATUS

[76] Inventor: Allan J. Yeomans, 60 Sunrise Blvd., Surfers Paradise, Gold Coast City, QLD 4217, Australia

[21] Appl. No.: 929,665

[22] Filed: Aug. 13, 1992

Related U.S. Application Data

[63] Continuation-in-part of Ser. No. 842,657, Feb. 27, 1992, abandoned.

[51] Int. Cl.[5] ................................................. F24J 2/42
[52] U.S. Cl. .................................... 126/565; 126/568; 126/600; 126/690; 126/696
[58] Field of Search ................................ 126/561–568, 126/684, 696, 600, 573, 690

[56] References Cited

U.S. PATENT DOCUMENTS

| | | |
|---|---|---|
| 4,090,496 | 5/1978 | Mallet . |
| 4,148,564 | 4/1979 | Devin et al. . |
| 4,203,426 | 5/1980 | Matlock et al. . |
| 4,219,387 | 8/1980 | Gruntman . |
| 4,227,511 | 10/1980 | Margen et al. . |
| 4,273,104 | 6/1981 | Uroshevich . |
| 4,281,640 | 8/1981 | Wells . |
| 4,315,500 | 2/1982 | Gonder . |
| 4,350,143 | 9/1982 | Laing et al. ........................ 126/568 |

FOREIGN PATENT DOCUMENTS

| | | |
|---|---|---|
| 58-156391 | 9/1983 | Japan . |
| 58-156392 | 9/1983 | Japan . |
| 58-156393 | 9/1983 | Japan . |
| 800515 | 1/1981 | U.S.S.R. ........................... 126/565 |

*Primary Examiner*—James C. Yeung
*Attorney, Agent, or Firm*—Wood, Phillips, Van Santen, Hoffman & Ertel

[57] ABSTRACT

A radiant energy collecting apparatus including a fluid reservoir, a platform floating on said fluid reservoir, a drive structure for moving the platform on the reservoir, radiant energy collectors supported on the platform, reflectors for concentrating radiant energy on the radiant energy collectors, and means for selectively submerging the concentrating means beneath fluid from the reservoir for protection against inclement weather conditions. Fluid feed impellers are supported beneath the platform within the reservoir and communicate with ports through the platform for pumping fluid onto the platform and reflectors. Opposing fluid impellers are associated with each fluid feed impeller, the opposing impellers being operable with the feed impellers to force fluid in an opposing direction to the feed impellers, with deflectors being disposed between the feed impellers and the opposing impellers. A duct is associated with at least one impeller and is configured so as to direct fluid adjacent the at least one impeller in a vertical direction and direct fluid through its other end at least partially in a horizontal direction. Flotation devices secured to the platform support the platform when the reflectors are submerged beneath fluid from the reservoir, the buoyancy of the flotation devices per unit height increasing from bottom to top of the flotation devices. Alternatively or in addition, a low pressure is established beneath the platform to restrain the platform against the buoyant force on the platform.

25 Claims, 6 Drawing Sheets

SOLAR ENERGY COLLECTING APPARATUS

CROSS-REFERENCE TO RELATED APPLICATION

This application is a continuation-in-part application of Ser. No. 842,657, filed Feb. 27, 1992, abandoned.

FIELD OF THE INVENTION

The present invention relates to solar energy collecting systems, and more particularly to solar energy collecting systems which may be both easily aligned and protected from inclement weather.

BACKGROUND OF THE INVENTION

To utilize solar energy for heating and ultimately for electricity generation it is generally necessary to concentrate the solar radiation to obtain higher temperatures in the energy storage and transport medium.

There are various methods used to concentrate the solar radiation. One method utilizes a circular mirror of parabolic section with the center line of the dish pointing at the sun. The parabolic mirror must be suitably mounted to permit constant movement to follow the arc of the sun through the sky.

Additionally, the alignment of the arc of the sun through the sky will change from day to day as the declination of the sun changes from summer solstice to the winter solstice. Complex mechanisms are required to fulfill these requirements.

In the above method, the solar energy is concentrated into a small single focus point where a suitable heat absorber is mounted and it is difficult to transport this energy to a utilization point.

In another system, long parallel mirrored troughs having a parabolic cross section are aligned with the sun. In this system, the concentration occurs at a focus line parallel with the alignments of the collecting troughs.

The collecting troughs may be aligned in a North-South direction and the troughs are so mounted as to permit them to follow the movement of the sun through the course of the day. Complex mechanisms are also required to fulfill this requirement.

The solar energy is then generally collected in a pipe containing a suitable heat absorbing liquid, the pipe being mounted at the focus line of the parabolic reflecting troughs.

In the trough collecting system, the troughs can also be mounted in an East-West alignment and it is then necessary to align the troughs to the arc line of the sun once each day to allow for change in declination. Complex mechanisms are also required to control this alignment.

In mounting parabolic reflecting troughs in either the North-South or the East-West configuration, the troughs are adjusted to maintain their focus on the sun by pivotally mounting on an axis parallel to the focus line of the collecting mirrors and generally requiring a multiplicity of rotating bearings and associated mounting structures.

It is, of course, important to properly support the reflecting troughs so that they do not bend or break, since such deformations will reduce their ability to reflect the solar energy to the focus line. However, due to the large size of such solar collectors (the amount of energy collected being essentially directly related to the area of the reflectors), such supports can be cumbersome and thereby not only expensive to build but also more difficult to move to maintain proper alignment of the reflectors such as previously discussed.

Also, it is generally necessary to arrange the reflecting surfaces of solar energy collecting apparatus so that they are not subject to the possibility of damage caused by such things as hail. This is often achieved by the use of high quality and consequently expensive toughened glass in the construction of the reflecting mirrors. Further protection against hail could be achieved by turning the mirrored surfaces away from the direction of on coming hail, or the use of large screens which may be moved over the top of the whole mirror system. However, either structure is necessarily complex and expensive, and can require considerable structural support to withstand strong winds.

It is an object of the present invention to overcome or substantially ameliorate the above-described disadvantages.

SUMMARY OF THE INVENTION

In one aspect of the present invention, a radiant energy collecting apparatus is provided, including a fluid reservoir, a platform floating on said fluid reservoir, a drive structure for moving the platform on the reservoir, radiant energy collectors supported on the platform, reflectors for concentrating radiant energy on the radiant energy collectors, and means for selectively submerging the concentrating means beneath fluid from the reservoir for protection against inclement weather conditions.

In one aspect of this invention, a low pressure is established beneath the platform to restrain the platform against the buoyant force on the platform of fluid in the reservoir.

In another aspect of the present invention, fluid feed impellers are supported beneath the platform within the reservoir and communicate with ports through the platform for pumping fluid onto the platform and reflectors. In still another aspect of the present invention, opposing fluid impellers are associated with each fluid feed impeller, the opposing impellers being operable with the feed impellers to force fluid in an opposing direction to the feed impellers, with deflectors being disposed between the feed impellers and the opposing impellers.

In yet another aspect of the present invention, a duct is associated with at least one impeller and is configured so as to direct fluid adjacent the at least one impeller in a vertical direction and direct fluid at the other end at least partially in a horizontal direction.

Another aspect of the present invention is the provision of flotation devices secured to the platform for supporting the platform when the reflectors are submerged beneath fluid from the reservoir, where the buoyancy of the flotation devices per unit height increases from bottom to top of the flotation devices.

It is an object of the present invention to provide a radiant energy collecting apparatus which may be easily and inexpensively constructed, installed, and operated in many different locations.

It is another object of the present invention to provide a radiant energy collecting apparatus in which the solar concentrators may be easily maintained in alignment with the sun.

It is still another object of the present invention to provide a radiant energy collecting apparatus which may be simply protected in adverse weather conditions or otherwise.

It is yet another object of the present invention to provide a radiant energy collecting apparatus which may be simply and easily assembled for collecting radiant energy over large surface areas.

Still another object of the present invention is to provide an inexpensive radiant energy collecting apparatus which is protected against breaking or other degradation which can result from excessive distortion.

DESCRIPTION OF THE PREFERRED EMBODIMENTS

Figure 1:
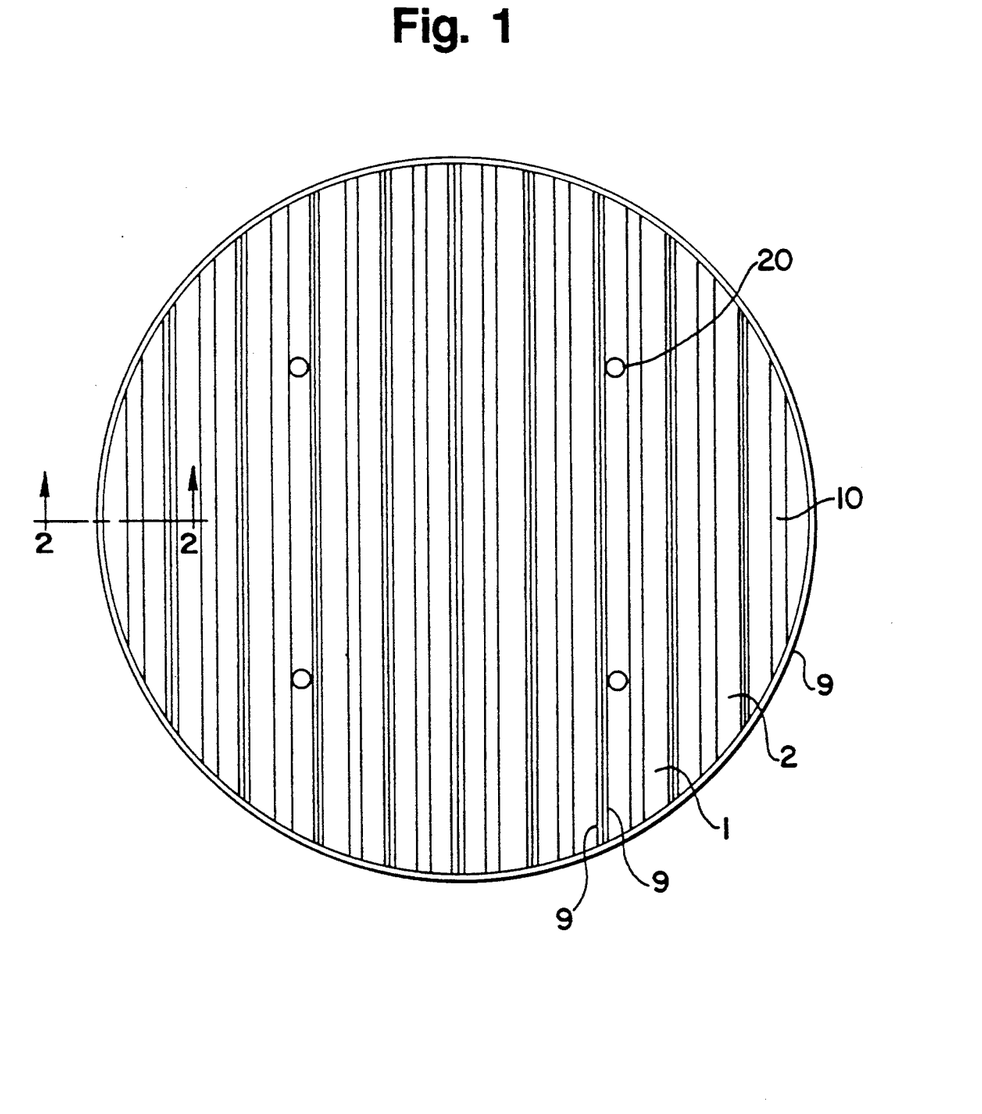
FIG. 1 is a plan view of one large raft system consisting of 10 individual parallel parabolic mirror systems in which the individual mirrors and overhead super structure have been omitted for clarity.
Figure 2:
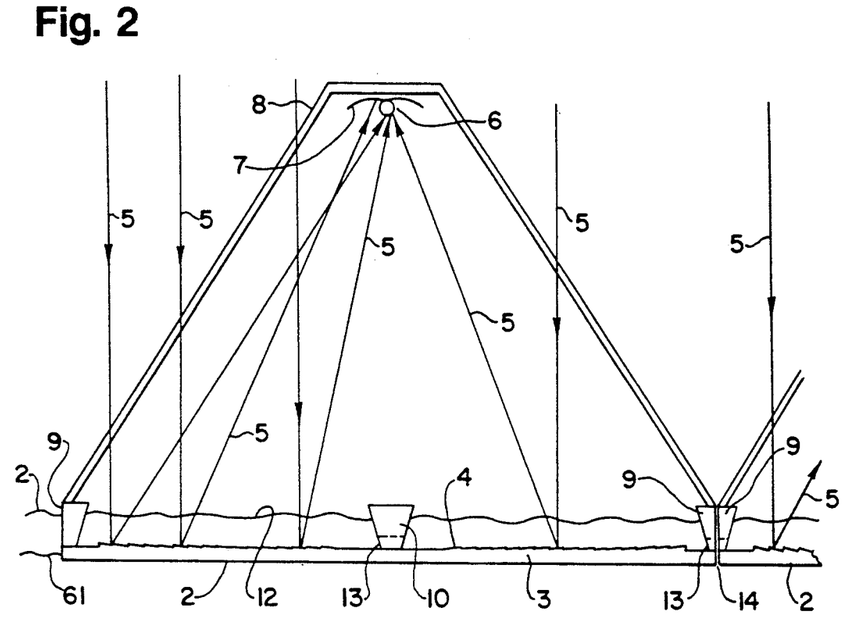
FIG. 2 is a sectional elevation of the raft system along line 2—2 of FIG. 1 and FIG. 3.
Figure 3:
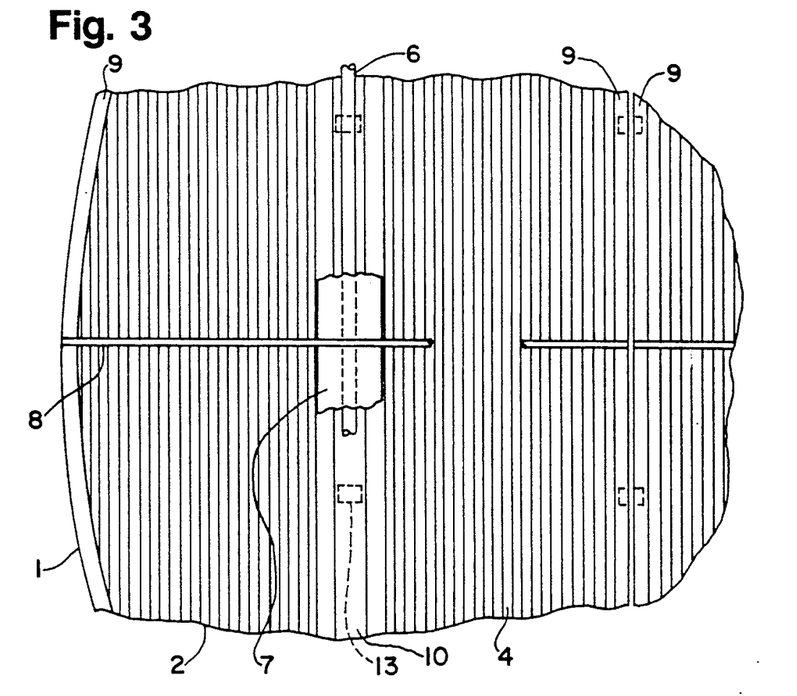
FIG. 3 is a partial plan view of the raft and mirror system as depicted in FIG. 2 and in the general area of view 2—2 in FIG. 1.

Referring to the drawings and firstly to FIG. 1, there is shown a plan view of a typical raft in which the plurality of individual reflector mirrors and the overhead solar collecting systems and their mountings have been omitted. These elements are illustrated in FIG. 2, which shows the buoyant raft 2 in which grooves 3 have been formed at varying angles and on which flat strips of mirrors 4 are attached. These mirrors 4 and their allied grooves are set at such an angle as to concentrate the rays of radiant energy (typically sunlight) 5 onto a solar collecting pipe 6. Further, should the alignment of the mirrors 4 be slightly inaccurate, the sunlight 5 will impinge on reflecting screen 7 and in turn onto the solar collecting pipe 6.

The solar collecting pipe 6 and reflecting screen 7 are mounted on a suitable frame 8 which is in turn mounted directly to the raft 2. Alternatively, the frame 8 can be indirectly mounted to the raft, as for example by mounting the frame 8 to the flotation blocks 9 which themselves are mounted directly to the raft 2.

In normal operation, the raft 2 would float in a reservoir with a relative water level as indicated by reference number 11. (Of course, the reservoir could be any suitably large body of water, whether an artificial pool, a natural bay, an estuary or a dam.

If weather conditions indicate that the mirrors 4 should be protected from possible damage by hail, then water from the reservoir is pumped by suitable means onto the top surface of the floating raft 2.

Figure 6A:
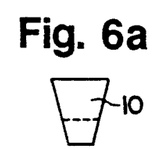
FIGS. 6a–c are end elevation, inverted plan, and side elevation views, respectively, of one of the flotation blocks illustrated in FIG. 2.
Figure 6B:
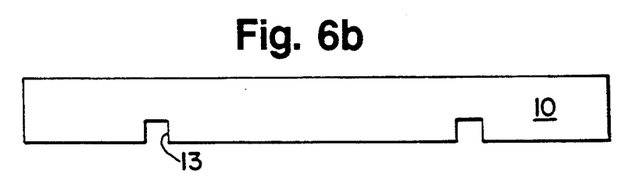
Figure 6C:
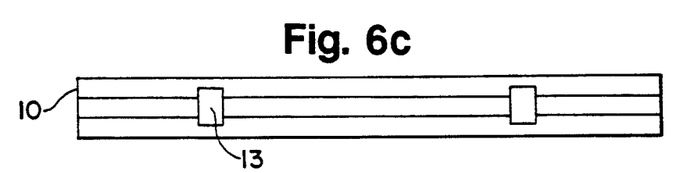

The outer diameter of the raft 2 (or the outer edge should it not be a round configuration) has attached to it or forming part of the raft 2 a small wall or flotation block 9 composed of a suitable flotation medium such as polystyrene. Also mounted on and rigidly attached to the raft 2 along their length are additional longitudinal flotation blocks 10. These flotation blocks 10, as best illustrated in FIGS. 6a–c, have cut outs 13 in their lower surface.

Further, it should be understood that while the raft 2 may itself be unitary, it is also within the scope of the present invention to form large rafts 2 by combining long parallel individual raft structures, which can be attached together in any suitable manner, as shown for example located at reference numeral 14 in FIG. 2.

Figure 4:
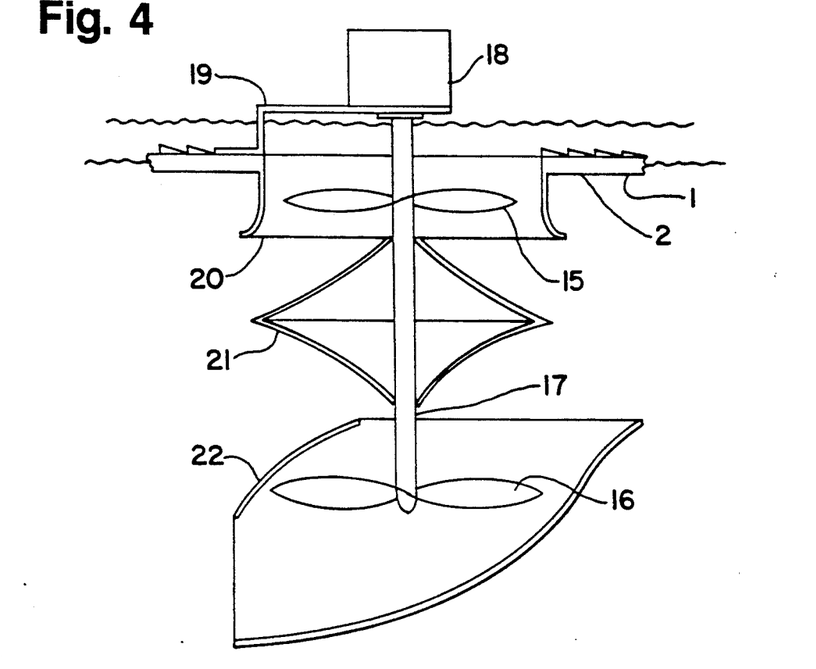
FIG. 4 is a side elevation of a water impeller usable with the present invention.
Figure 5:
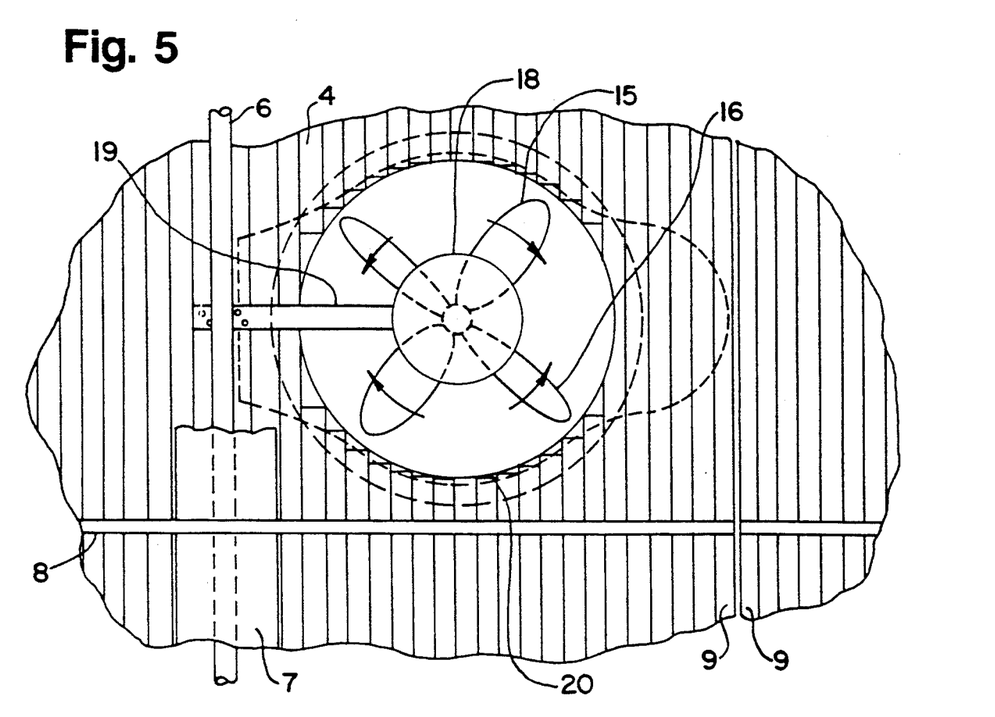
FIG. 5 is a partial plan view of the raft and mirror systems including the impeller of FIG. 4.

Located within the general area of the raft 2 and attached thereto adjacent spaced ports 20 are impellers 15 and 16 mounted on a drive shaft 17 which is driven by a suitable motor 18 itself suitably mounted, as by the bracket 19 shown, to the raft 2. The upper impellers 15 and lower impellers 16 preferably have an opposite pitch to their blades for a purpose to be described hereafter.

The ports 20 are located in the base of the raft 2 so as to permit the flow of water from under the raft 2 through to above the raft 2, and vice versa. In the preferred embodiment as shown in FIG. 4, the raft 2 is itself made of a sufficiently buoyant material so that it will support the entire apparatus with the mirrors 4 above the water level. Therefore, the ports 20 can be open as shown.

If, alternatively, the raft 2 requires additional buoyancy to maintain the mirrors 4 above the water level during normal operation, the raft 2 can be configured much like a boat with an outer rim enclosing a volume which will displace sufficient fluid so that the water level around the raft will not rise above the top of the rim (and thus, the mirrors 4 will not necessarily be covered with fluid even though they may be disposed at a lower level than the fluid level around the raft). In this alternative embodiment, the ports would preferably be closed during normal operation. This could be accomplished by providing suitably controlled valving to open or close the ports as required during operation.

Additional ducting 21 may also be included to assist the directional flow of the water.

Another ducting system 22 is preferably provided adjacent one or more lower impellers 16, which ducting system 22 is suitably mounted so as to direct the vertical flow of water through impeller 16 into a horizontal flow so as to permit the movement of the raft 2 to be controlled. Control can be accomplished in this manner by providing a single ducting system 22 which can be selectively directed, or alternatively can be accomplished by providing the system with multiple impellers 16, each directed differently, with movement then being controlled by operating only selected impellers.

Of course, it would be within the scope of at least one aspect of the present invention to provide an external drive for the raft 2. For example, if the raft 2 were located in a pool where it could reliably be positioned adjacent a side of the pool, movement of the raft 2 to follow the movement of the sun could be accomplished by a suitable drive at the side of the pool and engaging the raft, as shown for example in the below described alternative embodiment and also in the parent application to this application, Ser. No. 842,657 (the complete disclosure of which is hereby incorporated by reference).

Operation of the above described preferred embodiment of the apparatus is thus as follows.

In normal operation, when the mirrors 4 are exposed to the sun, the relative water level between the raft 2 and the reservoir in which the raft 2 is floating would be as indicated at reference numeral 11. Orientation of the raft 2 can be suitably controlled in response to the condition of the sun as previously described.

Should weather conditions indicate the possibility of damage to the mirrors 4 caused by such things as hail, then the motors 18 would be activated so to force water in the reservoir up through ports 20 onto the top surface of the raft 2.

The natural tendency is for water to concentrate in particular areas so that the raft 2 would be submerged to a greater extent at the location of the ports 20, with the mirrors 4 in other, higher, areas thereby still exposed to danger from the weather. However, the construction of the flotation blocks 9, 10 are such that they generally taper from their base to a wider section at their top. This tapered configuration causes the concentration of water in any particular area to spread out over the surface of the raft and ensure that an even depth of protective water will be provided over all of the mirrors 4. Thus, the mirrors 4 would all be reliably protected by water at a level such as indicated by reference numeral 12 in FIG. 2. In fact, the tapered configuration of the flotation blocks 9, 10 ensures that a consistent and even depth of water is maintained throughout the flooding process.

It should also be understood, however, that the flotation blocks 9, 10 could alternatively provide the desired graduated buoyancy by being stepped rather than continuously tapered. In such a configuration, however, it is highly preferred that the horizontal cross-sectional area of the flotation blocks be equal one with another at any particular distance from the raft 2.

Throughout the period of risk to the mirrors 4, the motor 18 would be kept operating at sufficient speed so that the upper impellers 15 would maintain the level 12 of protective water over the mirrors 4. (Further, the even flooding of water over the raft 2 is assisted by openings 13 cut into the bottom of the flotation blocks 9, 10, which openings 13 permit the water being pumped onto the raft 2 to circulate over the entire raft 2.

At the cessation of the risk to the mirrors 4, the motor 18 may be turned off. Due to the natural buoyancy of the raft 2, stopping the impeller 15 will permit a reverse flow back out through ports 20, so that the raft 2 will eventually refloat itself with the mirrors 4 uncovered and thus again operable to reflect solar energy to the collecting pipe 6. Further, in the preferred embodiment, the attachment of the individual sections forming the raft 2 (as shown at reference numeral 14) is generally such that leakage could occur therethrough as well (although such leakage should obviously be minimized sufficiently that the impellers 15 will be able to maintain the water at the desired level 12 during the weather period when the mirrors 4 require protection). Of course, it should also be appreciated that the operation of the flotation blocks 9, 10 in maintaining a level surface over the raft 2 will further assist in preventing pockets of water from being trapped on the raft 2 and thereby inhibiting the efficient operation of the apparatus.

Of course, to accelerate the flotation process, the motor 18 could be reversed causing the impeller 15 to force a downward flow of water through port 20. Such an operation would also be used with the previously described alternative embodiment of the present invention (that is, where the raft is configured as a boat), where the impeller 15 would thus function as a sump pump to remove the water from the raft.

During the operation of the impellers 15, the flow of water up through the ports 20 can tend to locally submerge the raft in the area adjacent to the ports 20 and impellers 15. The opposite pitch of the other impellers 16 rotating on the same drive shaft 17 prevents this operation however, by causing a counterbalancing upward force. By suitably selecting relative pitch and blade areas of the associated impellers 15, 16, the raft 2 can reliably be maintained in a level configuration despite the forces resulting from pumping fluid onto the raft during inclement weather.

Of course, if opposite rotation of the impellers 15, 16 is desired during removal of the water from the raft 2 following inclement weather, the vertical forces introduced by the two impellers 15, 16 reverse, with the bottom impellers 16 thereby providing counterbalancing forces which prevent the raft 2 from raising up at the location of the ports 20 (which configuration would undesirably tend to concentrate the fluid on the raft 2 in low areas away from the ports 20).

Of course, because of the opposite action of the coaxial impellers 15, 16, the additional ducting 21 desirably operates to separate the opposing flow of fluids generated by their rotation.

Figure 7:
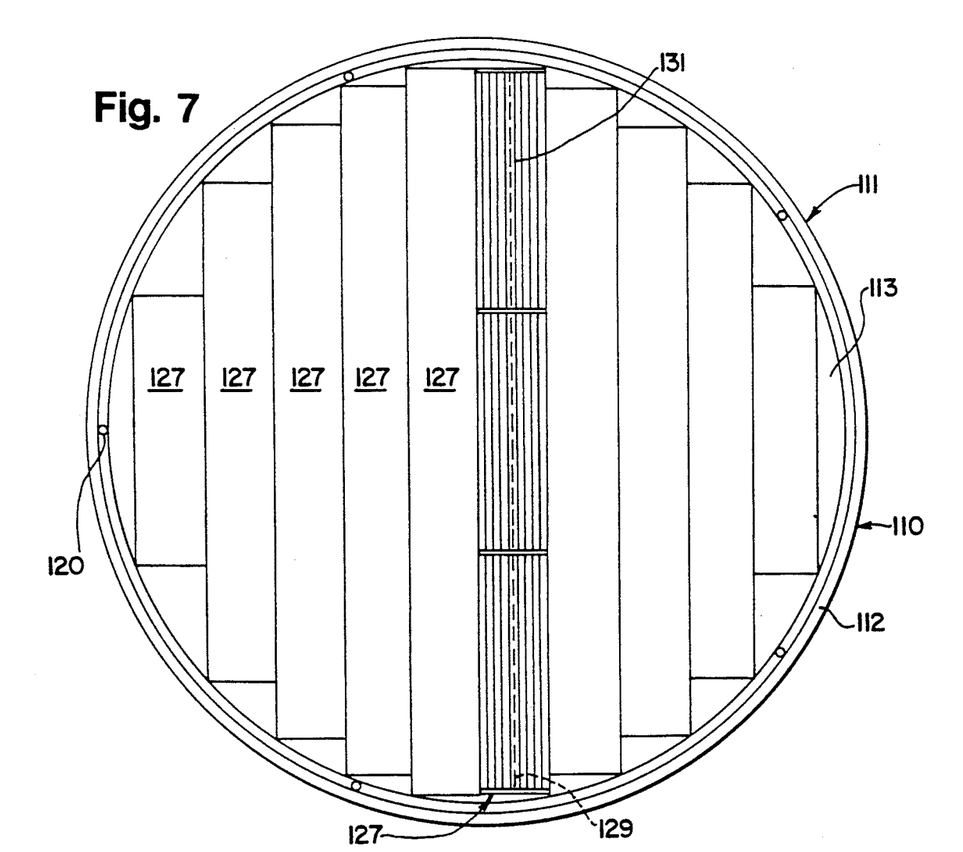
FIG. 7 is a plan view of another form of solar energy collecting apparatus according to the present invention.
Figures 8, 9:
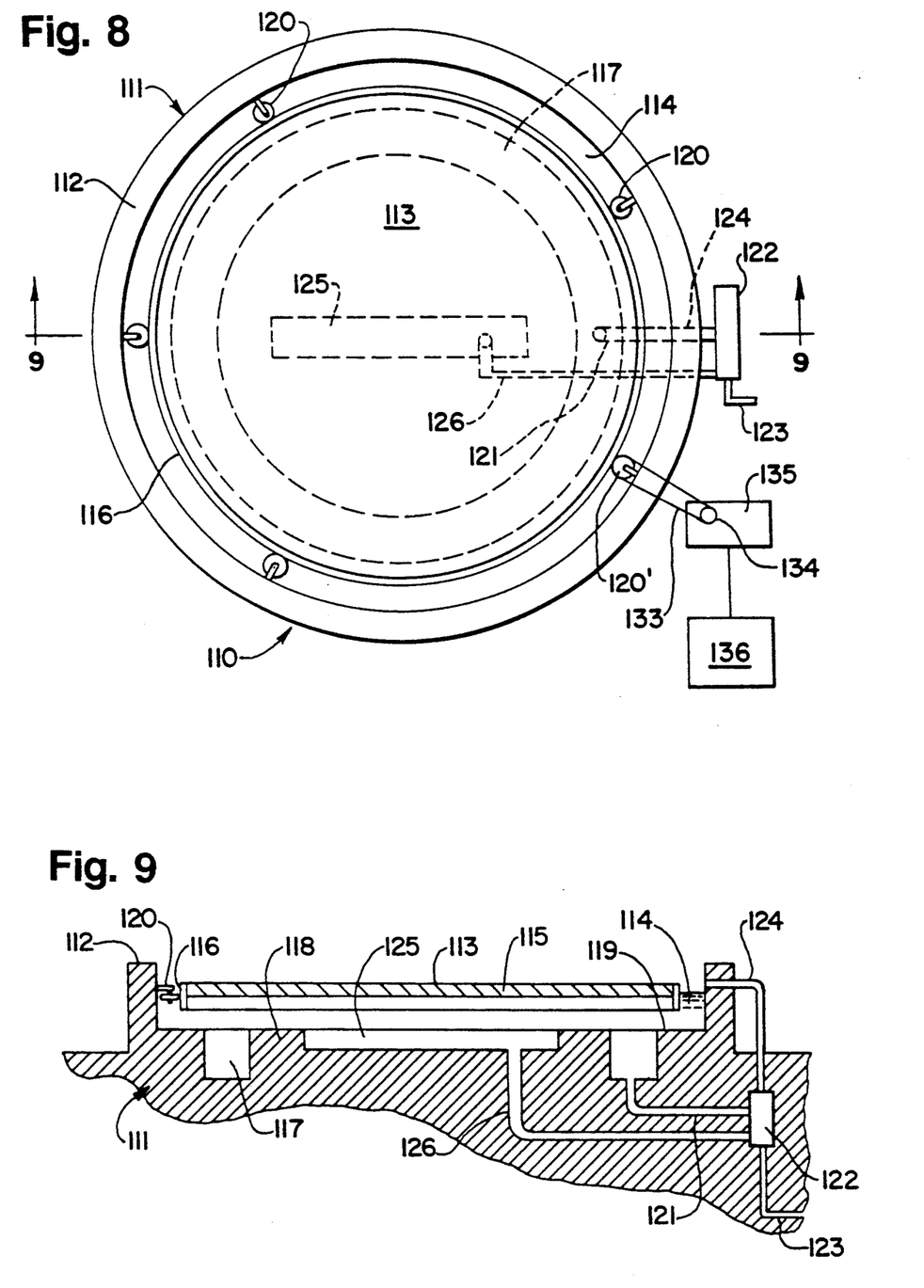
FIG. 8 is a plan view of the FIG. 7 apparatus showing details of the floatation control system for the apparatus.
FIG. 9 is a sectional elevation of the FIG. 7 apparatus along line 9—9 of FIG. 8.

Referring to the drawings and firstly to FIGS. 7-9, there is illustrated another preferred embodiment of a solar energy collecting apparatus 110 according to the present invention, including a circular water container or reservoir 111, which may for example comprise a pond or a dam or a purpose built container, including an outer wall 112 which encloses and contains water within the container 111. A platform 113 is located within the container 111 so as to float on water 114 contained therein which is at the level 115. The platform 113 may be constructed of a buoyant material such as a foam plastics material or be mounted on a layer of such material. Alternatively, the platform 113 may be formed with sealed air reservoirs or provided with other means to make it buoyant.

A hoop 116 is attached to or formed integrally with the platform 113 so as to form a generally water tight skirt around the outer diameter of the platform 113, the hoop 116 extending below the underside of the platform 113.

As shown in FIGS. 8 and 9, a trench 117 is constructed in the base 118 of the container 111 and is generally continuous around the container 111 so as to be of annular form. The outer diameter of trench 117 is less than the diameter of the hoop 116 thus forming a land 119 on which the hoop 116 will rest when water is withdrawn from the container 111.

Guide rollers 120 are mounted around the inside diameter of the container walls 112 so as to maintain the relative position of the platform 113 by pressing against the hoop 116. One or more of the rollers 120 may be motor driven to conveniently rotate the platform 113 to control the alignment of the solar energy collecting apparatus 110 with the sun.

One or more outlet pipes 121 are connected to suitable pump and valve units 122 to allow water to be pumped out from under the platform 113 to above the platform 113 by flow through outlets 124 or to an auxiliary water storage pond (not shown), via pipes 123. The water flow rates and directions can be controlled by the pump valve units 122.

The base 118 of the container 111 is also provided with a trough 125, the trough 125 communicating with pump-valve units 122 via a pipe 126.

Figure 10:
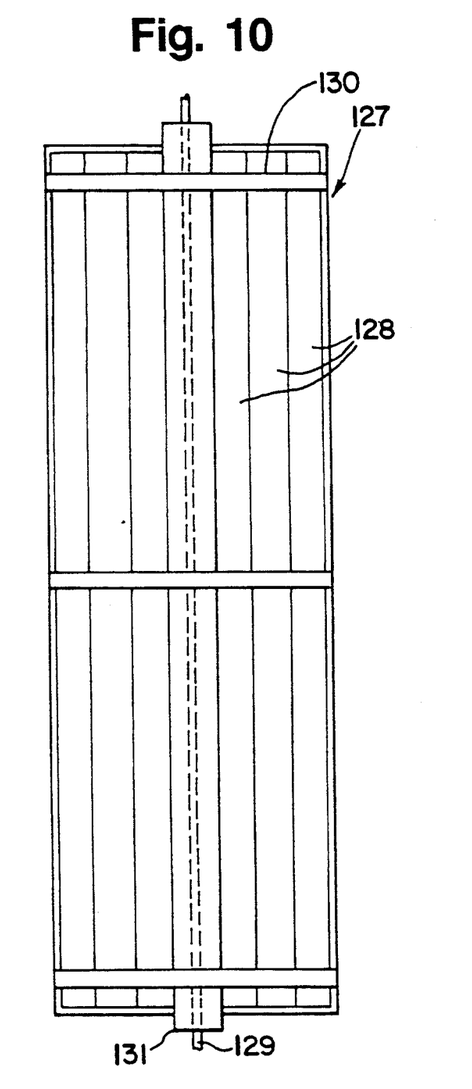
FIG. 10 is a plan view of one concentrating mirror system for use in the apparatus.
Figure 11:
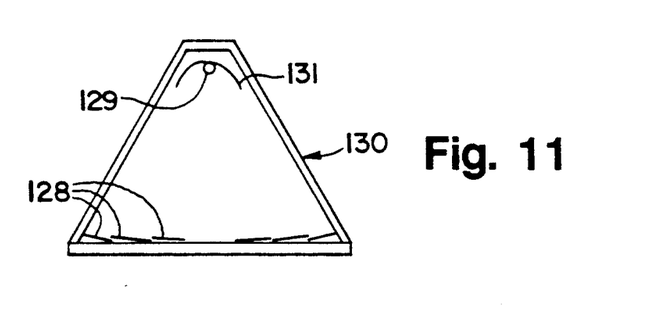
FIG. 11 is an end view of the system shown in FIG. 10.

Supported on the platform 113 are a plurality of solar concentrators 127 arranged as shown in FIG. 7 in a side-by-side attitude and each comprising as shown more clearly in FIGS. 10 and 11 a series of parallel mirrors 128 suitably curved and placed so as to act as one large elongated parabolic mirror. These mirrors 128 are arranged to focus the sunlight onto an overhead energy collector pipe 129, such as a black pipe, the collector pipe 129 being mounted on a suitable frame 130 of triangular form above the mirrors 128. The collector pipes 129 are suitably coupled together to allow for the collection of the heat energy in a manner common to the trade and subsequent utilization in any manner common to the trade, such as an energy supply for a steam turbine driven electricity generating plant. For this purpose, the collector pipes 129 may carry a heat or energy absorbing medium such as heat absorbing oil. The collector pipes 129 of the respective concentrators 127 may be coupled together for example through a manifold and the heated medium conveyed by the pipes 129 used for steam generation purposes. Alternatively, the medium carried by the collection pipes may be circulated in a closed system and heat exchangers used to extract the heat from the medium.

To compensate for slight errors in the alignment of the collecting mirrors 128, an arcuate reflector 131 is positioned above the collecting pipe 129 and so formed so as to act as a non-imaging optical concentrator.

Figure 12:
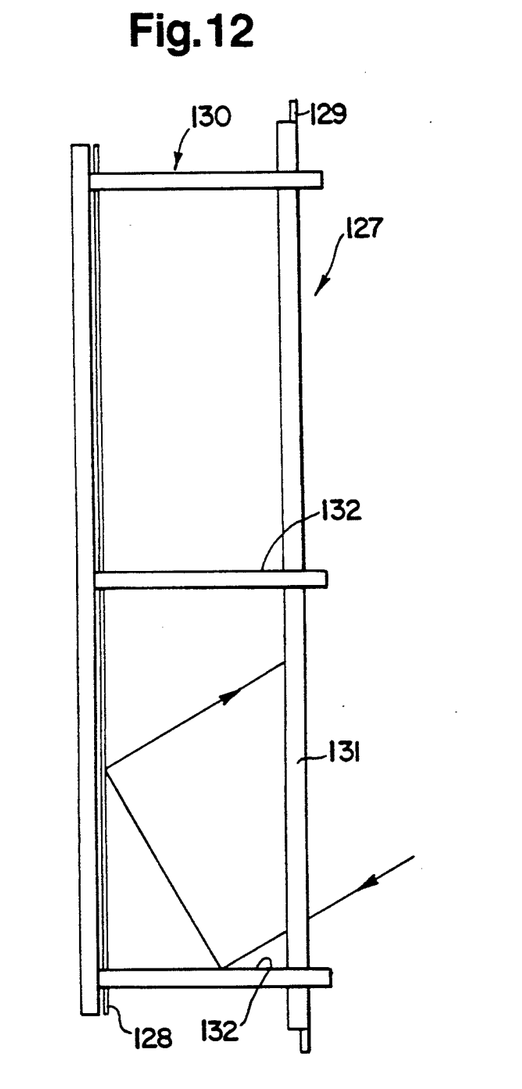
FIG. 12 is a side elevational view of the system of FIGS. 10 and 11.

To improve heat collection from elements of the frame 130 and other components of the structure which may intercept the radiant energy which would otherwise directly impinge upon collecting mirrors 128, mirrored or reflective surfaces 132 (see FIG. 12) are attached to or may form part of such components, the surfaces 132 being set substantially at 90° to the focus line of the mirrors 128 to cause the radiant energy of the sun to reflect therefrom onto the collecting mirrors 128 and thence to focus onto the collector pipe 129 or collecting mirror 131 as indicated by the arrows in FIG. 12.

As stated above, to cause rotation of the platform, one or more of the rollers 120 may be motor driven. For this purpose, one of the rollers 120' may be coupled through a belt 133 to a drive roller 134 which is adapted to be driven by a servomotor or other actuating means 135. Actuation of the servomotor 135 is controlled by a tracking apparatus 136 of any known type such as apparatus which employs phototransistors or other light sensitive means and a shadow effect. Of course, many different alternative systems may be employed for controlling or causing movement of the platform 113 in accordance with movement of the sun.

In use, when the sun rises in the East, the tracking apparatus 136 will cause through the servomotor or other actuating means 135, drive pulley 134, belt 133, and wheel 120' rotation of the floating platform 113 to move the concentrators 127 so that their longitudinal axes point towards the sun. As the sun moves across its arc, its movement will be tracked by the concentrators 127 with the platform 113 floating on the liquid 114 in the container 111 and carrying the concentrators 127 being rotated by its drive system. Thus at all times when the sun is up, the collection apparatus 110 is exposed to maximum radiant energy from the sun to thereby maximize energy collection. The use of the floating platform 113 allows for easy and convenient movement of the apparatus 110 to achieve and maintain alignment of the concentrators 127 with the sun.

Should a risk of hail or similar damaging weather phenomena look imminent, then pump 122 is turned on and water is pumped at high volume from the water container 111 to the storage pond causing the platform 113 to lower. The bottom of the skirt or hoop 116 will then come in contact with the base land 119 of the container 111 to produce a generally sealing effect. A slight pressure reduction will then occur under the whole platform at which time water is then caused to flow out through pipe 124 to the area above the platform 113. The pressure reduction under the platform 113 is maintained sufficiently to prevent the platform 113 from tending to float up above the water being pumped in at 123 and delivered through 124 so that the water covers the platform 113 and associated solar concentrators 127 to prevent damage thereto.

Alternatively, rather than rely on the pressure reduction under the platform 113 to maintain it submerged, mechanical means may be employed for this purpose. For example, holding pins or members mounted to the outer wall 111 of the container 112 may be extended inwardly after platform submergence to maintain the solar concentrating means 127 submerged. To permit the platform 113 to again float, the pins or members may be withdrawn. As yet another alternative, the platform may be provided with one or more reservoirs which may be filled with water to sink the platform or filled with air to enable the platform to float.

When the damage threat is gone water is then caused to flow back under the platform 113 to again float, the pins or members may be withdrawn.

Water may be directed back to the container 111 by directing the water through pipe 126 into a trough 125. As a degree of flexibility will exist in platform 113, directing water to the trough 121 positioned centrally under the platform 113 will cause the central area of the platform to become slightly elevated and thus ensure efficient and rapid draining when re-exposure of the concentrators 117 to the sun is required.

Alternatively, and as stated above, where the platform 113 of this embodiment is provided with a series of air chambers or reservoirs, those chambers may be filled with liquid to sink the concentrators and emptied of liquid to allow refloating thereof.

The present invention thus provides a solar energy collecting apparatus which is relatively inexpensive to construct and provides an efficient system for maximizing radiant energy received from the sun. The apparatus may be constructed of inexpensive and readily available materials and of a large size to suit commercial power generation purposes. Alternatively, the apparatus of the invention may be adapted for single household use.

Further, it should be understood that while the apparatus of the invention is particularly suited for collection of solar heat energy, the apparatus may also collect other forms of radiant energy which may be concentrated.

It should thus now be appreciated that the above described invention can be easily and inexpensively constructed, installed, and operated in many different locations, which invention provides reliable protection to its most fragile elements against potentially damaging inclement weather.

While the above has been given by way of illustrative embodiment of the invention, all such modifications and variations thereto as would be apparent to persons skilled in the art are deemed to fall within the broad scope and ambit of the invention as herein set forth.

I claim:

1. A radiant energy collecting apparatus, comprising:
  a fluid reservoir;
  a platform floating on fluid in said fluid reservoir;
  means for moving said platform within said reservoir;
  radiant energy collector means supported on said platform, said collector means carrying an energy transfer medium;
  means on said platform for concentrating radiant energy on said radiant energy collector means, said concentrating means comprising reflectors positioned to reflect solar energy toward said collector means, each said reflector comprising a plurality of side-by-side elongated reflector elements defining a substantially parabolic reflecting trough having a focal line, and said collector means being supported substantially at the focal line of said reflectors; and
  means for selectively submerging said reflectors beneath fluid to protect said reflector elements against inclement weather conditions;
  said collector means remaining above the fluid in which said reflectors are submerged so that energy is not lost from said collector means.

2. The apparatus of claim 1, wherein the submerging means comprises:
  means for pumping fluid onto said platform; and
  means for maintaining said fluid on said platform and over said concentrating means.

3. The apparatus of claim 2, wherein said maintaining means comprises means for establishing a low pressure beneath said platform to secure said platform beneath the level of fluid pumped into the reservoir.

4. The apparatus of claim 1, further comprising flotation devices secured to said platform for supporting said platform when said concentrating means are submerged beneath fluid from said reservoir.

5. The apparatus of claim 4, wherein the buoyancy of the flotation devices per unit height increases from bottom to top of said flotation devices.

6. The apparatus of claim 5, wherein said flotation devices are elongate and secured to said platform along their length, said devices being tapered outwardly from a narrow bottom side adjacent said platform to a wide top side.

7. The apparatus of claim 1, wherein said collector means comprise elongated pipes carrying an energy transfer medium.

8. The apparatus of claim 1, wherein said collector means are supported by a framework at a spaced position from said reflector elements substantially at the focus of the defined parabolic reflecting trough, said framework further including reflectors to direct radiant energy toward the collector means.

9. A radiant energy collecting apparatus, comprising:
  a fluid reservoir;
  a platform floating on said fluid reservoir;
  means for moving said platform within said reservoir;
  radiant energy collectors supported on said platform;
  means on said platform for concentrating radiant energy on said radiant energy collectors;
  means for selectively submerging said concentrating means beneath fluid from said reservoir for protection against inclement weather conditions, said submerging means including
    fluid feed impellers supported beneath said platform within said reservoir, said fluid feed impellers communicating with ports through said platform, and
    means for maintaining said fluid on said platform and over said concentrating means.

10. The apparatus of claim 9, further comprising:
  opposing fluid impellers associated with each fluid feed impeller, said opposing impellers being operable with said feed impellers to force fluid in an opposing direction to said feed impellers; and
  deflectors between said feed impellers and said opposing impellers.

11. The apparatus of claim 10, wherein said feed impellers have an opposite pitch from said opposing impellers, and associated feed impellers and opposing impellers are secured to and axially spaced on common vertically oriented drive shafts.

12. The apparatus of claim 9, wherein said moving means comprises a duct associated with at least one impeller and connecting two duct openings, said duct directing fluid through the opening adjacent the at least one impeller in a vertical direction and directing fluid through the other opening at least partially in a horizontal direction.

13. A radiant energy collecting apparatus, comprising:
  a fluid reservoir;
  a platform supporting radiant energy collectors and means for concentrating radiant energy on said radiant energy collectors; said platform floating on said fluid reservoir and being sufficiently buoyant to support the concentrating means above the fluid level in the reservoir;
  means for moving said platform within said reservoir;
  means for selectively submerging said concentrating means beneath fluid from said reservoir for protection against inclement weather conditions, including
    fluid feed impellers supported beneath said platform within said reservoir, said fluid feed impellers communicating with ports through said platform, and
    means for maintaining said fluid on said platform and over said concentrating means.

14. The apparatus of claim 13, further comprising:
  opposing fluid impellers associated with each fluid feed impeller, said opposing impellers being operable with said feed impellers to force fluid in an opposing direction to said feed impellers; and
  deflectors between said feed impellers and said opposing impellers.

15. The apparatus of claim 14, wherein said feed impellers have an opposite pitch from said opposing impellers, and associated feed impellers and opposing impellers are secured to and axially spaced on common vertically oriented drive shafts.

16. The apparatus of claim 13, wherein said moving means comprises a duct associated with at least one impeller and connecting two duct openings, said duct directing fluid through the opening adjacent the at least one impeller in a vertical direction and directing fluid through the other opening at least partially in a horizontal direction.

17. A radiant energy collecting apparatus, comprising:
- a fluid reservoir;
- a platform floating on said fluid reservoir, said platform including a rim therearound for separating fluid in the reservoir from the concentrating means on the platform;
- means for moving said platform within said reservoir;
- radiant energy collectors supported on said platform;
- means on said platform for concentrating radiant energy on said radiant energy collectors; and
- means for selectively submerging said concentrating means beneath fluid from said reservoir for protection against inclement weather conditions, said submerging means comprising a fluid impeller secured to said collecting apparatus and selectively operable to move fluid between the apparatus and the reservoir.

18. A radiant energy collecting apparatus, comprising:
- a fluid reservoir;
- a platform floating on said fluid reservoir;
- means for moving said platform within said reservoir;
- radiant energy collectors supported on said platform;
- means on said platform for concentrating radiant energy on said radiant energy collectors;
- means for pumping fluid onto said platform for selectively submerging said concentrating means beneath fluid from said reservoir for protection against inclement weather conditions;
- fluid feed impellers supported beneath said platform within said reservoir, said fluid feed impellers communicating with ports through said platform;
- flotation devices secured to said platform for supporting said platform when said concentrating means are submerged beneath fluid from said reservoir, the buoyancy of the flotation devices per unit height increasing from bottom to top of said flotation devices.

19. The apparatus of claim 19, further comprising:
- opposing fluid impellers associated with each fluid feed impeller, said opposing impellers being operable with said feed impellers to force fluid in an opposing direction to said feed impellers; and
- deflectors between said feed impellers and said opposing impellers.

20. The apparatus of claim 19, wherein said feed impellers have an opposite pitch from said opposing impellers, and associated feed impellers and opposing impellers are secured to and axially spaced on common vertically oriented drive shafts.

21. The apparatus of claim 18, wherein said moving means comprises a duct associated with at least one impeller and connecting two duct openings, said duct directing fluid through the opening adjacent the at least one impeller in a vertical direction and directing fluid through the other opening at least partially in a horizontal direction.

22. The apparatus of claim 18, wherein said platform is sufficiently buoyant to support the concentrating means above the fluid level in the reservoir.

23. The apparatus of claim 18, wherein said flotation devices are elongate and secured to said platform along their length, said devices being tapered outwardly from a narrow bottom side adjacent said platform to a wide top side.

24. A solar energy collecting apparatus, comprising:
- a body of fluid;
- a flexible platform floating on said body of fluid, said platform including a rim therearound;
- means for moving said platform on said body of fluid to track movement of the sun;
- solar energy collectors supported on said platform;
- means on said platform for concentrating solar energy on said solar energy collectors; and
- means for selectively submerging said concentrating means beneath fluid for protection against inclement weather conditions, including
  - means for directing fluid onto said platform to submerge said concentrating means, said rim maintaining said fluid on said platform and over said concentrating means, and
  - means for maintaining said platform at a substantially horizontal attitude whereby said directed fluid submerges substantially all of said concentrating means at a substantially uniform depth when being protected against inclement weather conditions.

25. A solar energy collecting apparatus, comprising:
- a body of fluid;
- a platform floating on said body of fluid, said platform including a fluid barrier about its periphery;
- means for moving said platform on said body of fluid to track movement of the sun;
- radiant energy collector means supported on said platform, said collector means carrying an energy transfer medium;
- reflectors on said platform positioned to reflect solar energy toward said collector means, each said reflector including a plurality of side-by-side elongated reflector elements defining a substantially parabolic reflecting trough having a focal line, and said collector means being supported substantially at the focal lines of said reflectors;
- means for directing fluid onto said platform to selectively submerge said reflectors, said fluid barrier means maintaining said directed fluid on said platform and over said reflectors; and
- a plurality of buoyancy adjustment elements secured to said platform, said buoyancy adjustment elements being spaced about the platform and having a horizontal crosssectional area which increases from their bottom toward their top to maintain said platform at substantially horizontal attitude when fluid is directed onto said platform to selectively submerge substantially all of said reflectors at a substantially uniform depth.

* * * * *